United States Patent
Hultermans

[19]

[11] Patent Number: 5,993,071
[45] Date of Patent: Nov. 30, 1999

[54] APPARATUS FOR CONNECTING OPTICAL FIBRE CONNECTORS

[75] Inventor: Antonius Petrus Cornelius Maria Hultermans, Tilburg, Netherlands

[73] Assignee: The Whitaker Corporation, Wilmington, Del.

[21] Appl. No.: 08/937,413

[22] Filed: Sep. 25, 1997

[30] Foreign Application Priority Data

Sep. 30, 1996 [NL] Netherlands .......................... 96115686

[51] Int. Cl.⁶ ...................................................... G02B 6/38
[52] U.S. Cl. ................................ 385/70; 385/53; 385/58; 385/60; 385/77; 385/78
[58] Field of Search ................................ 385/53, 58, 60, 385/69, 70, 77, 78, 140

[56] References Cited

U.S. PATENT DOCUMENTS

| | | | |
|---|---|---|---|
| 4,695,126 | 9/1987 | Cook ........................................... | 385/58 |
| 4,743,084 | 5/1988 | Manning ................................. | 385/70 X |
| 5,082,378 | 1/1992 | Muller et al. .............................. | 385/72 |
| 5,594,825 | 1/1997 | Kawasaki et al. ......................... | 385/60 |
| 5,745,621 | 4/1998 | Musk .......................................... | 385/72 |

FOREIGN PATENT DOCUMENTS

| | | | |
|---|---|---|---|
| 0 063 085-B1 | 9/1985 | European Pat. Off. .......... | G02B 6/36 |
| 1 583 612 | 1/1981 | United Kingdom ............. | G02B 5/14 |
| 2 056 705 | 3/1981 | United Kingdom ............. | G02B 5/14 |

*Primary Examiner*—Brian Healy

[57] ABSTRACT

The invention relates to an adapter for optica fiber connectors for connecting a first optical fiber connector, which has a first optical fiber end which is mounted in a sleeve, the end face of the optical fiber end and the sleeve extending perpendicular to the longitudinal axis of the first optical fiber, to a second optical fiber connector, which has a second optical fiber end, which is mounted in a sleeve, the end face of the optical fiber end and the sleeve extending obliquely to the longitudinal axis of the second optical fiber. The adapter has an optical fiber section which is mounted in a sleeve, and it is the case that the first end face extends perpendicular to the longitudinal axis of the optical fiber section, and the second end face extends obliquely to the longitudinal axis of the optical fiber section. An optical fiber connector can be inserted from either end of the adapter. Direct coupling takes place between the optical fibers.

6 Claims, 2 Drawing Sheets

APPARATUS FOR CONNECTING OPTICAL FIBRE CONNECTORS

BACKGROUND OF THE INVENTION

1. Field of the Invention

The invention relates to an apparatus for connecting a first optical fibre connector to a second optica bre connector.

2. Description of the Prior Art

In optical transmission systems, optical fibre connectors frequently have to be connected to one another or to optical or optoelectronic modules. Since, use is currently being made in these systems with both optical fibre connectors in which the end face of the optical fibre end and the sleeve in which the optical fibre is mounted extend perpendicular to the longitudinal axis of the optical fibre, and connectors in which this end face is disposed at an angle to the longitudinal axis of the optical fibre, it can happen that connectors of such different systems have to be connected to one another. It is, for example, also possible for an optical fibre connector with an inclined end face to have to be connected to an optical or optoelectronic module, for which purpose such a connector must, however, have an end face extending perpendicular to the longitudinal axis, or vice versa.

SUMMARY OF THE INVENTION

It is the object of this invention to specify an adapter for optical fibre connectors which renders it possible for optical fibre connectors with perpendicular and inclined end faces to be interconnected, or for optical fibre connectors with a perpendicular or inclined end face to be connected to a corresponding different optical fibre system.

The object is achieved by means of an apparatus for connecting a first optical fibre connector, which has a first optical fibre end which is mounted in a sleeve, the end face of the optical fibre end and the sleeve extending perpendicular to the longitudinal axis of the first optical fibre, to a second optical fibre connector, which has a second optical fibre end, which is mounted in a sleeve, the end face of the optical fibre end and the sleeve extending obliquely to the longitudinal axis of the second optical fibre, the apparatus comprising a housing having an optical fibre section which is mounted in a sleeve therein, and a first end face of the optical fibre section and the sleeve extends perpendicular to the longitudinal axis of the optical fibre section, and a second end face of said section extends obliquely to the longitudinal axis of the optical fibre section, where the optical fibre connectors are insertable from either end of the housing.

The object is further achieved by an apparatus for mounting on the end face of an optical fibre connector with an optical fibre end mounted in a sleeve, and an end face of the optical fibre end and the sleeve extend across the longitudinal axis of the optical fibre, the apparatus comprising a housing having an optical fibre section which is mounted in a sleeve, in that a first end face on the side facing the optical fibre connector of the sleeve and the optical fibre section extends in accordance with the end face of the optical fibre connector, and in that a second end face of the sleeve and the optical fibre section opposite the first end face has extends at an angle to the longitudinal axis of the optical fibre section other than the angle the first end face extends relative to the longitudinal axis of the optical fibre section.

An adapter according to the invention contains an optical fibre section which is mounted in a sleeve. At one end, this optical fibre section forms with the sleeve an end face which extends perpendicular to the longitudinal axis of the optical fibre section, and, at the other end, an end face which extends obliquely to the longitudinal axis of the optical fibre section. This renders it possible for the adapter to be joined at one end to an optical fibre connector whose end face extends perpendicular to the axis, and to be joined at the other end to an optical fibre connector whose end face extends obliquely to the axis.

Particularly accurate coupling is achieved by of the fact that the sleeve with the optical fibre section is located in a guide tube into which the sleeves of the optical fibre connectors respective coupled can be inserted. The optical fibres are adjusted to one another as a result. It is, furthermore, advantageous that the present invention can be configured as an adapter in such a way that it is mounted on an optical fibre connector having one end face orientation and the present another end face orientation to a mating connector. In this case, the adapter is constructed such that it can be mounted, for example, on an optical fibre connector with a perpendicular end face, and itself has an end face which is constructed obliquely.

It is, furthermore, advantageous when latching means are provided on the adapter in order to latch an insertable optical fibre connector.

DETAILED DESCRIPTION OF THE PREFERRED EMBODIMENT

Figure 1:
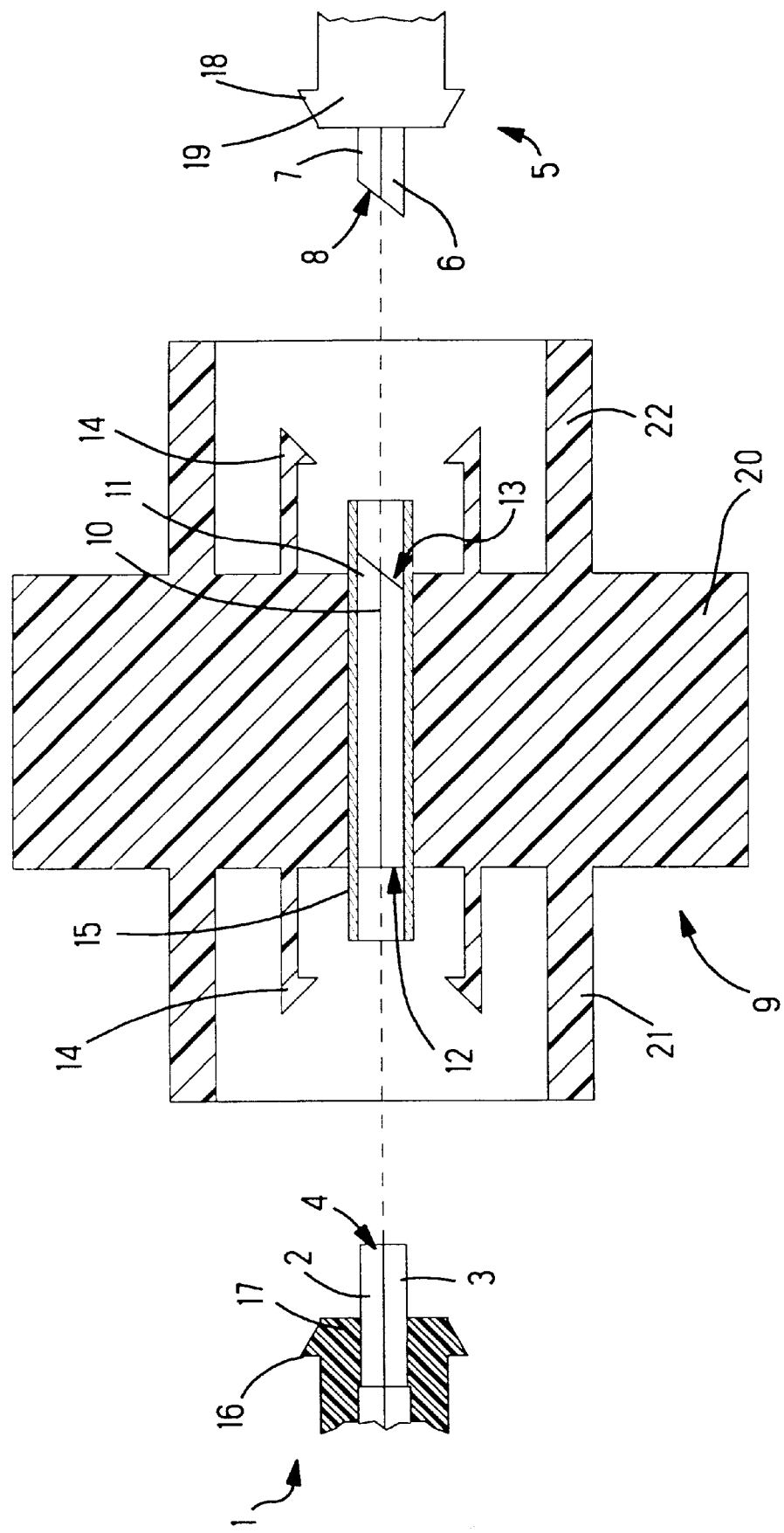
FIG. 1 shows a diagrammatic cross-section through an adapter for two optical fibre connectors and two corresponding, diagrammatically illustrated, optical fibre connectors.

Represented in FIG. 1 is a first optical fibre connector 1, which in the plug-in region has a sleeve 2 with an optical fibre end 3 mounted therein, an end face 4 of the optical fibre end and sleeve extend perpendicular to the axis of the optical fibre. The optical fibre connector 1 further has latching noses 16, which are provided on opposite sides of housing 17.

Represented in a corresponding fashion at the other end of FIG. 1 is a second optical fibre connector 5 with a sleeve 6 and an optical fibre end 7, an end face 8 of the sleeve 6 and optical fibre 7 form an angle ≠90° to the longitudinal axis of the optical fibre. Latching noses 18 are also provided on a housing 19 of connector 2.

An adapter 9 has a housing 20, which has coaxial hollow cylindrical stubs at two ends. Arranged likewise coaxial therewith in the adapter 9 is an optical fibre section 10, which is mounted in a sleeve 11. The first end face 12 of the sleeve 11 and the optical fibre section 10 is constructed, in accordance with the optical fibre connector which can be inserted from this end, perpendicular to the longitudinal axis. A second end face 13 of the sleeve 11 and optical fibre section 10 is constructed in an inclined fashion with respect to the longitudinal axis. The sleeve 11 with the optical fibre section 10 is located in a guide tube 15, which projects at both ends over the end faces 12 and 13 as the coaxial hollow cylindrical stubs referred to above. The guide tube 15 serves to guide the sleeves 2, 6 of the first and second optical fibre connectors 1, 5. Furthermore, the adapter 9 has latching means 14 which grip the rear of the corresponding latching noses 16, 18 on the housings 17, 19 of the optical fibre connectors 1, 5.

When the adapter 9 is joined to the optical fibre connectors 1,5, coupling occurs between the optical fibre 3 in the first connector 1 and the optical fibre section 10 in the adapter 9 and from there to the optical fibre 7 in the second connector 5.

Figure 2:
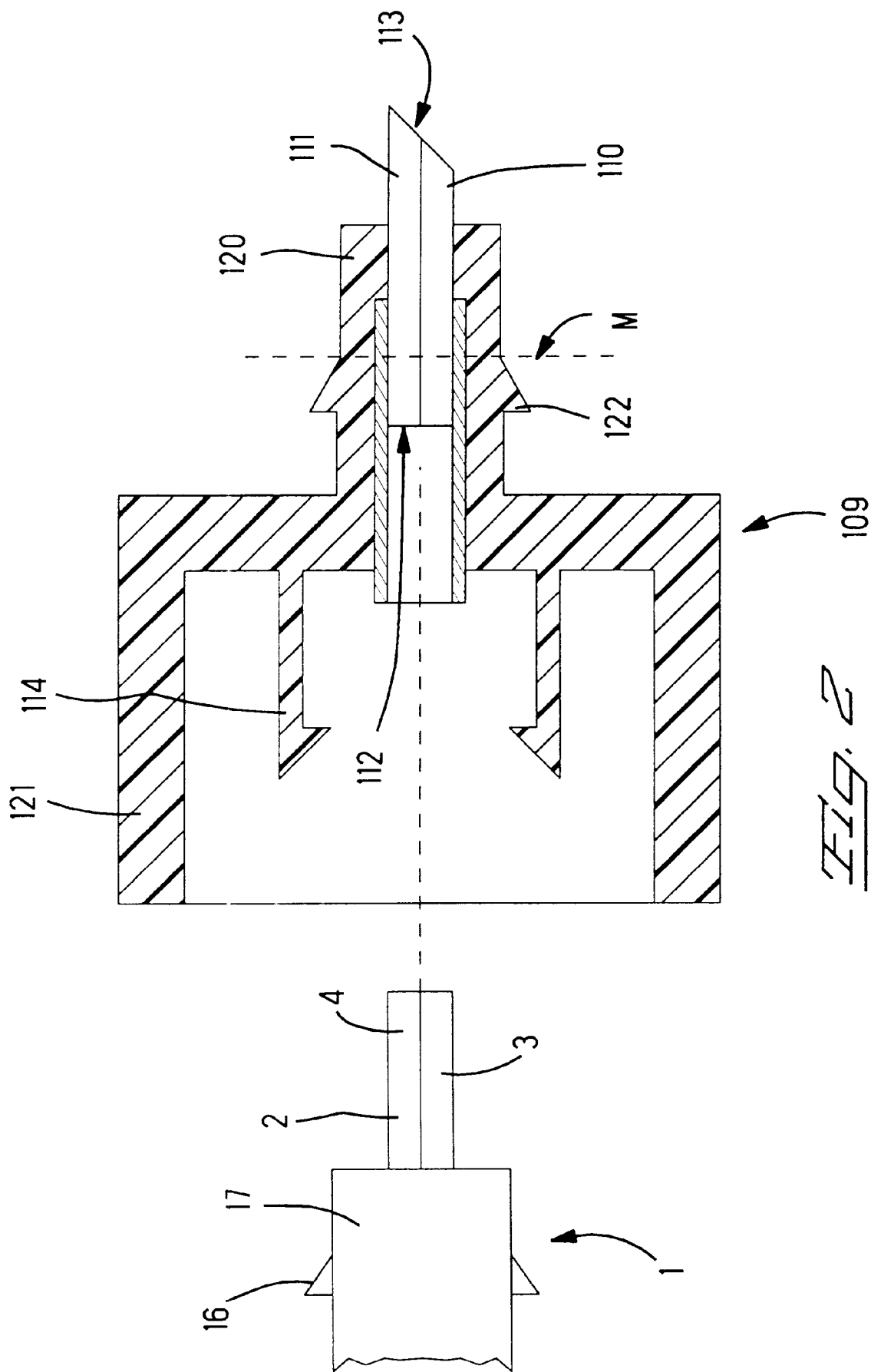
FIG. 2 shows a diagrammatic cross-section through an adapter for an optical fibre connector which is constructed like a connector on the side averted from the optical fibre.

The optical fibre connector represented on the left in FIG. 2 corresponds to that represented in FIG. 1 and includes the same reference numbers. An adapter 109, up to centre line M, likewise corresponds essentially to the adapter 9 represented in FIG. 1. An insertion stub 121 is provided, and a housing 120. Located in the latter is an sleeve 111 with an optical fibre section 110 with a first, perpendicular end face 112 and a second, inclined end face 113. Also provided are latching means 114 for retaining the inserted optical fibre connector 1 and latching with the latching noses 16 thereof. However, the sleeve 111 is located with the optical fibre section 110 only partially in a guide tube 115; the other part of the sleeve 111 projects beyond the housing 120 and thus forms an arrangement corresponding to an optical fibre connector having an inclined end face, such as connector 5 of FIG. 1. Latching noses 122 are provided on the housing 120 in a fashion likewise corresponding to second optical fibre connector 5. It is thus possible to insert the optical fibre connector 1 with the adapter 109 into an opening for an optical fibre connector incorporating an inclined end face. Such an adapter can, of course, also be provided for an optical fibre connector with an inclined end face, the adapter then having at the end averted from the optical fibre connector an end face perpendicular to the longitudinal axis.

Instead of a transition from an inclined end face to a perpendicular end face, it is also possible to provide with just such a one a transition from an inclined end face with a first angle of inclination to an inclined end face with a second angle of inclination.

I claim:

1. An apparatus for connecting a first optical fibre connector, which has a first optical fibre end which is mounted in a first sleeve, the end face of the first optical fibre end and the first sleeve extending perpendicular to the longitudinal axis of the first optical fibre, to a second optical fibre connector, which has a second optical fibre end, which is mounted in a second sleeve, the end face of the first optical fibre end and the first sleeve extending obliquely to the longitudinal axis of the second optical fibre, the apparatus comprising a housing having an optical fibre section of a third optical fibre, which is mounted in a third sleeve therein, and a first end face of the optical fibre section and the third sleeve extends perpendicular to the longitudinal axis of the optical fibre section, and a second end face of said optical fibre section extends obliquely to the longitudinal axis of said optical fibre section, where the optical fibre connectors are insertable from either end of the housing.

2. An apparatus for mounting on the end face of an optical fibre connector with an optical fibre end mounted in a first sleeve, and an end face of the optical fibre end and the first sleeve extend across the longitudinal axis of the optical fibre, the apparatus comprising a housing having an optical fibre section which is mounted in a second sleeve, in that a first end face on the side facing the optical fibre connector of the second sleeve and the optical fibre section extends in accordance with the end face of the optical fibre connector, and in that a second end face of the second sleeve and the optical fibre section opposite the first end face extends at an angle to the longitudinal axis of the optical fibre section other than the angle the first end face extends relative to the longitudinal axis of the optical fibre section, wherein at the second end face, the end averted from the optical fibre connector, the housing is constructed as an optical fibre connector and can be used for coupling to a mating connector.

3. The apparatus according to claim 1, wherein the sleeve with the optical fibre section is surrounded by a coaxial guide tube which projects at both ends beyond the end faces of the sleeve and serves to guide the sleeves of the insertable optical fibre connectors.

4. An apparatus for mounting on the end face of an optical fibre connector with an optical fibre end mounted in a first sleeve, and an end face of the optical fibre end and the first sleeve extend across the longitudinal axis of the optical fibre, the apparatus comprising a housing having an optical fibre section which is mounted in a second sleeve, in that a first end face on the side facing the optical fibre connector of the second sleeve and the optical fibre section extends in accordance with the end face of the optical fibre connector, and in that a second end face of the second sleeve and the optical fibre section opposite the first end face extends at an angle to the longitudinal axis of the optical fibre section other than the angle the first end face extends relative to the longitudinal axis of the optical fibre section, wherein the second sleeve with the optical fibre section is inserted in part, at the end facing the optical fibre connector, into a guide tube that at the end facing the optical fibre connector projects beyond the first end face of the second sleeve and serves to guide the second sleeve of the insertable optical fibre connector.

5. The apparatus according to claim 1, wherein latching means are provided in order to latch an insertable optical fibre connector on the housing.

6. An apparatus for mounting on the end face of an optical fibre connector with an optical fibre end mounted in a first sleeve, and an end face of the optical fibre end and the first sleeve extend across the longitudinal axis of the optical fibre, the apparatus comprising a housing having an optical fibre section which is mounted in a second sleeve, in that a first end face on the side facing the optical fibre connector of the second sleeve and the optical fibre section extends in accordance with the end face of the optical fibre connector, and in that a second end face of the second sleeve and the optical fibre section opposite the first end face extends at an angle to the longitudinal axis of the optical fibre section other than the angle the first end face extends relative to the longitudinal axis of the optical fibre section, wherein latching means are provided in order to latch an insertable optical fibre connector on the housing.

\* \* \* \* \*